(12) United States Patent
Kim et al.

(10) Patent No.: US 10,488,709 B2
(45) Date of Patent: Nov. 26, 2019

(54) FLUORESCENT SHEET AND LIGHT UNIT AND LIQUID CRYSTAL DISPLAY INCLUDING THE SAME

(71) Applicant: Samsung Display Co., Ltd., Yongin, Gyeonggi-Do (KR)

(72) Inventors: Soon Young Kim, Suwon-si (KR); Yui-Ku Lee, Asan-si (KR); Dae Won Lee, Asan-si (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 303 days.

(21) Appl. No.: 14/573,739

(22) Filed: Dec. 17, 2014

(65) Prior Publication Data

US 2015/0378217 A1    Dec. 31, 2015

(30) Foreign Application Priority Data

Jun. 25, 2014    (KR) .......................... 10-2014-0078243

(51) Int. Cl.
*G02F 1/13357*    (2006.01)
*G02F 1/1335*    (2006.01)

(52) U.S. Cl.
CPC ...... *G02F 1/133617* (2013.01); *G02F 1/1336* (2013.01); *G02F 1/133524* (2013.01);
(Continued)

(58) Field of Classification Search
CPC ........ G01F 2001/133614; G01F 2001/133624; G01F 1/133617; G02F 2001/133614;
(Continued)

(56) References Cited

U.S. PATENT DOCUMENTS

2005/0224828 A1* 10/2005 Oon ...................... H01L 33/504
257/99
2006/0268537 A1* 11/2006 Kurihara .............. G02B 6/0023
362/34
(Continued)

FOREIGN PATENT DOCUMENTS

CN    1880839 A    12/2006
CN    101832518 A    9/2010
(Continued)

OTHER PUBLICATIONS

Natori, Light-Emitting Element, Method of Manufacturing the Same, Display Device, and Electronic Apparatus, Jul. 11, 2013, JP2013137931A, English.*

(Continued)

*Primary Examiner* — Bryon T Gyllstrom
*Assistant Examiner* — James M Endo
(74) *Attorney, Agent, or Firm* — Innovation Counsel LLP

(57) ABSTRACT

A color conversion film includes fluorescent dots and a polymer layer, the fluorescent dots distributed within the polymer layer; a barrier film at one surface of the color conversion film; and a transflective film at another surface of the color conversion film. An organic or inorganic phosphor may be partially or entirely applied to the fluorescent sheet and the transflective film is applied to a bottom surface of the fluorescent sheet, thereby enhancing light efficiency without causing harm to the environment, as well as reducing a manufacturing cost.

13 Claims, 6 Drawing Sheets

(52) U.S. Cl.
CPC .. *G02F 1/133528* (2013.01); *G02F 1/133603* (2013.01); *G02F 2001/133614* (2013.01); *G02F 2001/133624* (2013.01)

(58) Field of Classification Search
CPC ... G02F 2001/133624; G02F 1/133617; G02F 1/133606; G02F 1/133609; G02F 1/133621; G02F 1/1336; G02F 1/133603
See application file for complete search history.

(56) References Cited

U.S. PATENT DOCUMENTS

| | | | |
|---|---|---|---|
| 2008/0012031 A1* | 1/2008 | Jang | C09K 11/02 257/89 |
| 2009/0034288 A1* | 2/2009 | Ho | G02B 6/0051 362/606 |
| 2009/0162011 A1* | 6/2009 | Coe-Sullivan | G09F 13/22 385/31 |
| 2009/0180055 A1* | 7/2009 | Kim | G02F 1/133603 349/69 |
| 2009/0250714 A1 | 10/2009 | Yun et al. | |
| 2009/0262516 A1* | 10/2009 | Li | H01L 33/56 362/84 |
| 2010/0020531 A1* | 1/2010 | Choi | G02F 1/133617 362/84 |
| 2010/0033947 A1* | 2/2010 | Lin | G02F 1/133603 362/84 |
| 2010/0110728 A1 | 5/2010 | Dubrow et al. | |
| 2010/0321919 A1* | 12/2010 | Yang | F21S 8/00 362/84 |
| 2011/0037926 A1* | 2/2011 | Tsukahara | G02B 6/0023 349/64 |
| 2011/0090670 A1* | 4/2011 | Ahn | G02F 1/133617 362/84 |
| 2011/0102708 A1* | 5/2011 | Kurihara | G02B 6/0031 349/62 |
| 2011/0215700 A1* | 9/2011 | Tong | F21V 3/02 313/46 |
| 2011/0228514 A1* | 9/2011 | Tong | H01L 25/0753 362/84 |
| 2011/0273864 A1* | 11/2011 | Izawa | C09K 11/7741 362/84 |
| 2012/0074833 A1* | 3/2012 | Yuan | H05B 33/14 313/483 |
| 2012/0087124 A1* | 4/2012 | Ravillisetty | C09K 11/0883 362/235 |
| 2012/0113672 A1† | 5/2012 | Dubrow | |
| 2012/0320607 A1* | 12/2012 | Kinomoto | H01L 27/322 362/351 |
| 2012/0327631 A1* | 12/2012 | Tsang | F21V 9/10 362/84 |
| 2013/0002986 A1* | 1/2013 | Kadowaki | G02F 1/133617 349/65 |
| 2013/0285090 A1 | 10/2013 | Furuyama et al. | |

FOREIGN PATENT DOCUMENTS

| | | |
|---|---|---|
| CN | 103165645 A | 6/2013 |
| EP | 0581232 A1 | 2/1994 |
| JP | 2006251076 A † | 9/2006 |
| JP | 2008-137187 | 6/2008 |
| JP | 2013137931 A * | 7/2013 |
| KR | 10-2011-0069611 A | 6/2011 |
| KR | 10-2012-0133062 A | 12/2012 |
| KR | 10-1210066 | 12/2012 |

OTHER PUBLICATIONS

Jang; "White-Light-Emitting Diodes with Quantum Dot Color Converters for Display Backlights"; Advanced Materials; 2010; pp. 3076-3080.

Chen; "A High-Efficiency Wide-Color-Gamut Solid-State Backlight System for LCDs Using Quantum Dot Enhancement Film"; SID 2012 Digest-895; ISSN 097-966X/12/4302-0895; pp. 895-896.

* cited by examiner
† cited by third party

FLUORESCENT SHEET AND LIGHT UNIT AND LIQUID CRYSTAL DISPLAY INCLUDING THE SAME

CROSS-REFERENCE TO RELATED APPLICATION

This application claims priority to and the benefit of Korean Patent Application No. 10-2014-0078243 filed in the Korean Intellectual Property Office on Jun. 25, 2014, the entire contents of which are incorporated herein by reference.

BACKGROUND (a) Field

The present invention relates to a fluorescent sheet and a light unit, and a liquid crystal display including the same, and more particularly, to a fluorescent sheet including a transflective film and a light unit, and a liquid crystal display including the same.

(b) Description of the Related Art

Unlike emissive displays such as plasma display panels (PDPs), field emission displays (FEDs), etc., liquid crystal displays (LCDs) are non-emissive displays that are incapable of emitting light by themselves, and thus incident light from the exterior of the LCD is required to display an image.

Thus, a backlight unit (BLU) for emitting light is positioned at a rear side of an LCD.

A cold cathode fluorescent lamp (CCFL) has been used as a light source for the BLU for the LCD.

However, as sizes of the LCDs become larger, when the CCFL is used as the light source, there is a problem that luminance uniformity is not guaranteed and color purity deteriorates.

Recently, a BLU using three color LEDs has been developed, and the BLU using these three color LEDs as a light source can implement high color purity, thereby being applicable to high quality display devices.

However, the BLU using three color LEDs has a drawback that its cost is very high compared with that of the BLU using the CCFL as the light source.

In order to overcome such a drawback, a white LED is being developed in which light emitting out of a single color LED chip is converted into white light.

However, while the white LED is economically feasible, it has a problem that color purity and color reproducibility are low, and thus efforts to use a semiconductor nanocrystal as the BLU have recently been made to improve the color reproducibility and the color purity and to ensure price competitiveness.

However, such a semiconductor nanocrystal also has a problem in that it emits light in all directions, and thus the light directed toward a front direction is no more than about 50% at maximum, a cost of the semiconductor nanocrystal is high, and generally-used cadmium-based materials are environmentally harmful.

The above information disclosed in this Background section is only for enhancement of understanding of the background of the disclosure and therefore it may contain information that does not form the prior art that is already known to a person of ordinary skill in the art.

SUMMARY

A fluorescent sheet and a light unit, and a liquid crystal display including the fluorescent sheet are provided, which can improve light efficiency by partially or entirely using organic and inorganic phosphors rather than a costly semiconductor nanocrystal and applying a transflective film to a bottom surface of the fluorescent sheet.

In one aspect, a fluorescent sheet includes a color conversion film including fluorescent dots and a polymer layer, the fluorescent dots distributed within the polymer layer; a barrier film at one surface of the color conversion film; and a transflective film at another surface of the color conversion film.

The fluorescent dots may include one or more of an organic compound, an inorganic compound, and a semiconductor nanocrystal.

The organic compound, the inorganic compound, and the semiconductor nanocrystal may include one or more of a green phosphor and a red phosphor.

The green organic compound may include one or more of coumarin-based, fluorescein-based, cyanine-based, boron dipyrromethene-based, dansyl-based, acridine-based, SYBR green-based, and rhodamine-based compounds, and the red organic compound may include one or more of rhodamine-based, DCM dicyanomethane-based, benzophenoxazine-based, boron dipyrromethene-based, perylene-based, and Nile red-based compounds.

The green inorganic compound may include one or more selected from oxide-based, sulfide-based, and nitride-based compounds. The oxide-based compound may be $(Sr,Ba,Ca,Mg)_2SiO_4:Eu^{2+}$ or $(Sr,Ba,Ca,Mg)_3SiO_5:Eu^{2+}$, the sulfide-based compound may be $SrGa_2S_4:Eu$, the nitride-based compound may be $(\beta\text{-}SiAlON:Eu^{2+})$, $(Sr,Ba)Si_2O_2N_2:Eu^{2+}$, $(Ba,Sr,Ca)_2SiO_4:Eu^{2+}$, or $Ba_3Si_6O_{12}N_2:Eu^{2+}$, and the red inorganic compound may include a nitride-based compound and one or more selected from $(Sr,Ca)AlSiN_3:Eu^{2+}$ and $(Ba,Sr,Ca)_2Si_5N_8:Eu^{2+}$.

The color conversion film may contain 0.4 to 0.8 wt % of the fluorescent dots based on its total weight.

The color conversion film may be formed to have a thickness of 20 μm to 150 μm.

The barrier film may include one or more selected from a polyethylene terephthalate (PET) film, polycarbonate (PC), and co-polyethylene terephthalate (CoPET).

The color conversion film and the barrier film may further include an inorganic oxide, and the inorganic oxide may include one or more selected from silica, alumina, titania, and zirconia.

The transflective film may transmit blue light but reflect green and red light.

The transflective film may include a dielectric multilayer of a silicon oxide and a titanium oxide.

The transflective film may be formed to have a thickness of 0.1 μm to 1.5 μm.

In another aspect, a light unit is provided, the light unit including: a light source; a fluorescent sheet installed to be spaced apart from the light source and converting incident light from the light source into white light to emit it toward a liquid crystal panel; and a light guide panel positioned between the light source and the fluorescent sheet. The fluorescent sheet may include: a color conversion film including fluorescent dots and a polymer layer where the fluorescent dots are distributed; a barrier film positioned at one surface of the color conversion film; and a transflective film positioned at another surface of the color conversion film.

In yet another aspect, a liquid crystal display is provided, the liquid crystal display including: a liquid crystal panel including upper and lower polarizers attached thereon or thereunder; and a light unit positioned under the liquid crystal panel. The light unit may include: a light source; a fluorescent sheet installed to be spaced apart from the light source and converting incident light from the light source into white light to emit it toward a liquid crystal panel; and a light guide panel positioned between the light source and the fluorescent sheet. The fluorescent sheet may include: fluorescent dots and a polymer layer where the fluorescent dots are distributed; a barrier film positioned at one surface of the color conversion film; and a transflective film positioned at another surface of the color conversion film.

An organic or inorganic phosphor is partially or entirely applied to the fluorescent sheet instead of the semiconductor nanocrystal, and the transflective film is applied under the fluorescent sheet, thereby reducing the manufacturing cost and having an advantage of enhancing light efficiency without causing harm to the environment.

DETAILED DESCRIPTION OF THE EMBODIMENTS

Figure 1:
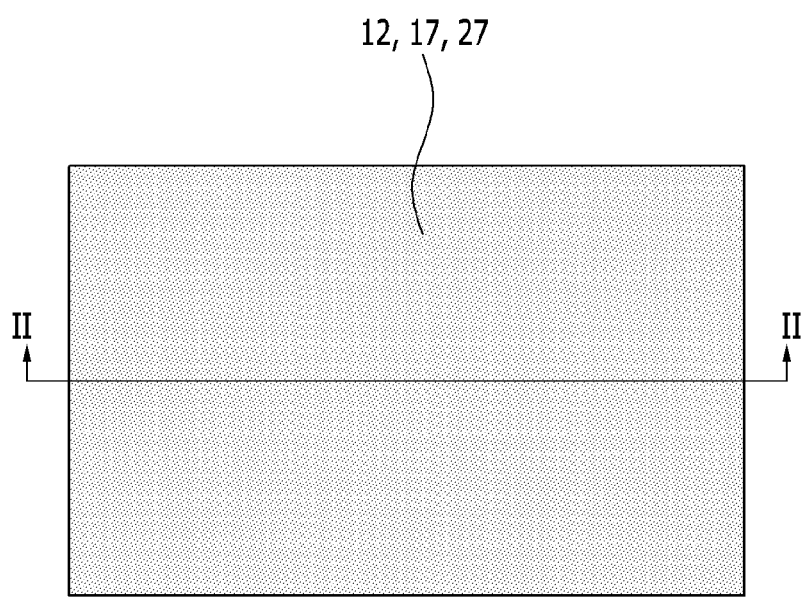
FIG. 1 is a top plan view of a fluorescent film according to an example embodiment of the present disclosure.

Example embodiments will be described more fully hereinafter with reference to the accompanying drawings.

As those skilled in the art would realize, the described embodiments may be modified in various different ways, all without departing from the spirit or scope of the present invention.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element, or intervening elements may also be present.

In contrast, when an element is referred to as being "directly on" another element, there are no intervening elements present.

A fluorescent sheet will now be described with reference to FIGS. 1 and 2.

Figure 2:
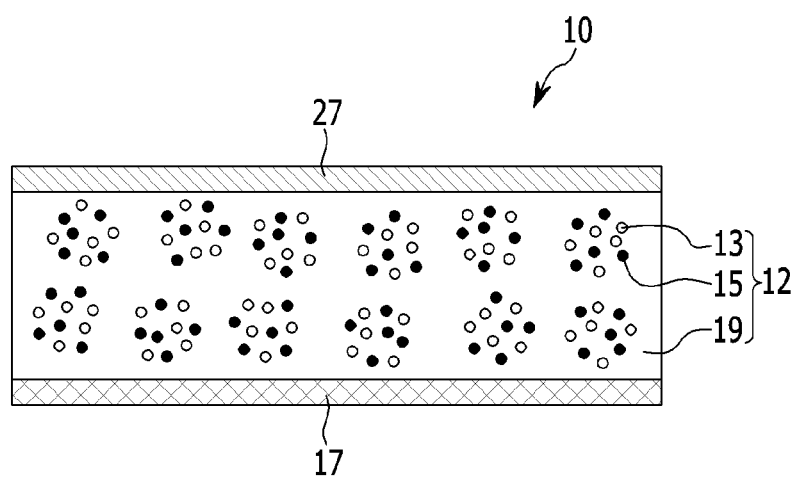
FIG. 2 is a cross-sectional view of the fluorescent film of FIG. 1 taken along the line II-II.

FIG. 1 is a top plan view of the fluorescent sheet according to an example embodiment of the present disclosure, and FIG. 2 is a cross-sectional view of the fluorescent sheet of FIG. 1 taken along the line II-II.

Referring to FIGS. 1 and 2, a fluorescent sheet 10 includes a color conversion film 12 including a polymer layer 19 where green fluorescent dots 15 and red fluorescent dots 13 are distributed.

The polymer layer 19 is formed of a plastic resin.

The plastic resin includes various materials that form a polymer or film, and of the types of materials that may be used are not limited thereto.

In the example embodiment of the present disclosure, the plastic resin used in polymer layer 19 transmits light even if it is hardened, and light transmittance is not limited thereto.

The fluorescent dots 13 and 15 are distributed in the polymer layer 19 of the color conversion film 12 to implement color reproducibility and color purity.

The fluorescent dots 13 and 15 may be selected from an organic compound, an inorganic compound, and a semiconductor nanocrystal, or a combination thereof.

Among the organic compounds, a green organic phosphor may include, for example, one or more of coumarin-based, fluorescein-based, cyanine-based, boron dipyrromethene-based, dansyl-based, acridine-based, SYBR green-based, and rhodamine-based compounds, and a red organic phosphor may include one or more of rhodamine-based, dicyanomethane (DCM)-based, benzophenoxazine-based, boron dipyrromethene (BODIPY)-based, perylene-based, and Nile red-based compounds, but they are not limited thereto.

Among the inorganic compounds, a green inorganic phosphor may include one or more of oxide-based, sulfide-based, and nitride-based compounds.

An oxide-based green inorganic phosphor may include, for example, one of silicate-based compounds such as (Sr, Ba,Ca,Mg)$_2$SiO$_4$:Eu$^{2+}$ having a composition of M$_2$SiO$_4$, (Sr,Ba,Ca,Mg)$_3$SiO$_5$:Eu$^{2+}$ having a composition of M$_3$SiO$_5$, sulfide-based compounds having a composition of SrGa$_2$S$_4$: Eu, or nitride-based compounds having a composition of β-SiAlON.

Among crystals having a crystalline structure of β-type Si$_3$N$_4$, a nitride-based green inorganic phosphor may include crystals (β-SiAlON:Eu$^{2+}$) of a Eu-doped nitride or oxynitride.

An oxynitride-based green inorganic phosphor may include a phosphor of (Sr,Ba)Si$_2$O$_2$N$_2$:Eu$^{2+}$, (Ba,Sr,Ca)$_2$SiO$_4$:Eu$^{2+}$, or Ba$_3$Si$_6$O$_{12}$N$_2$:Eu$^{2+}$.

A red-based inorganic phosphor may include one or more of nitride-based compounds, and may use one or more selected from (Sr,Ca)AlSiN$_3$:Eu$^{2+}$ and (Ba,Sr,Ca)$_2$Si$_5$N$_8$: Eu$^{2+}$.

The semiconductor nanocrystal may be selected from a group II-VI compound, a group IV-VI compound, a group IV element, a group IV compound, and a combination thereof.

The group II-VI compound may be selected from: a group of two-element compounds selected from CdSe, CdTe, ZnS, ZnSe, ZnTe, ZnO, HgS, HgSe, HgTe, MgSe, MgS, and a mixture thereof; a group of three-element compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a group of four-element compounds selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

A group III-V compound may be selected from: a group of two-element compounds selected from GaN, GaP, GaAs, GaSb, AlN, AlP, AlAs, AlSb, InN, InP, InAs, InSb, and a mixture thereof; a group of three-element compounds selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a group of four-element compounds selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The group IV-VI compound may be selected from: a group of two-element compounds selected from SnS, SnSe, SnTe, PbS, PbSe, PbTe, and a mixture thereof; a group of three-element compounds selected from SnSeS, SnSeTe, SnSTe, PbSeS, PbSeTe, PbSTe, SnPbS, SnPbSe, SnPbTe, and a mixture thereof; and a group of four-element compounds selected from SnPbSSe, SnPbSeTe, SnPbSTe, and a mixture thereof.

The group IV element may be selected from a group of Si, Ge, and a mixture thereof.

The group IV compound may be a two-element compound selected from a group of SiC, SiGe, and a mixture thereof.

However, in the fluorescent sheet 10 according to an example embodiment of the present disclosure, it is preferable that the single organic compound or inorganic compound is exclusively used or the organic compound and the inorganic compound are collectively used, and the semiconductor nanocrystal may be further included.

Because a cost of the semiconductor nanocrystal is high compared with the organic and inorganic compounds and cadmium Cd used as a general forming material of the semiconductor nanocrystal is environmentally harmful because it is a heavy metal, the semiconductor nanocrystal is partially or entirely replaced by the organic or inorganic compounds, thereby enhancing cost-effectiveness and environmental friendliness.

In order to produce light having the desired color, the color conversion film 12 may include 0.4 wt % to 0.8 wt % of the fluorescent dots 13 and 15 based on its total weight, and it may be formed to have a thickness of 20 μm to 150 μm, and the values are preferably 0.5 wt % and 100 μm.

This is because, when too many fluorescent dots 13 and 15 are included, the fluorescent dots 13 and 15 may interact with each other to cause a side effect of light quenching, and the desired light color cannot be implemented when the thickness of the color conversion film is too thinly formed.

The organic compound, the inorganic compound, and semiconductor nanocrystal may be present in a particle in uniform concentrations or may have partially different concentrations in the same particle, respectively.

In addition, a core/shell structure in which some fluorescent dots 13 and 15 enclosing the other some fluorescent dots 13 and 15 may be possible.

An interfacing surface between the core and the shell may have a concentration gradient in which a concentration of an element decreases closer to its center.

The fluorescent dots 13 and 15 may have a full width at half maximum (FWHM) of a light-emitting wavelength spectrum which is less than about 45 nm.

In this range, the color purity and reproducibility of the fluorescent sheet 10 can be improved.

In addition, shapes of the fluorescent dot 13 and 15 are not specifically limited to shapes that are generally used in the related art, but specifically, it is desirable that a nanoparticle having a spherical, pyramidal, multi-arm, or cubic shape, a nanotube, a nanowire, a nanofiber, or a planar nanoparticle are used.

In FIG. 2, the color conversion film 12 is illustrated to include a mixture of the red fluorescent dots 13 and the green fluorescent dots 15, but may consist of a first layer including the red fluorescent dots 13 and a second layer including the green fluorescent dots 15.

The color conversion film 12 may further include an inorganic oxide, and the inorganic oxide may be selected from silica, alumina, titania, zirconia, and a combination thereof.

The inorganic oxide may act as a light-diffusing material.

The fluorescent sheet 10 further includes a barrier film 27 at a top surface of the color conversion film 12, and a transflective film 17 at a bottom surface of the color conversion film 12.

However, the barrier film 27 may be omitted if necessary.

The barrier film 27 may be formed of at least one of a polyethylene terephthalate (PET) film, polycarbonate (PC), and co-polyethylene terephthalate (CoPET).

The barrier film 27 may further include an inorganic oxide.

The inorganic oxide may be selected from silica, alumina, titania, zirconia, and a combination thereof, and the inorganic oxide may function as a light diffusing material.

In addition, the barrier film 27 may have protrusions and depressions on a surface that does not contact the color conversion film 12.

The barrier film 27, a surface of which is formed with the protrusions and depressions, may serve to diffuse light that is emitted from an LED light source.

The barrier film 27 may have oxygen permeability of about 0.01 $cm^3 \cdot mm/m^2 \cdot day \cdot atm$ to about 0.5 $cm^3 \cdot mm/m^2 \cdot day \cdot atm$, and moisture permeability of about 0.001 $g/m^2 \cdot day$ to 0.01 $g/m^2 \cdot day$.

When having these ranges of the oxygen permeability and the moisture permeability, the fluorescents dots 13 and 15 can be stably protected from an external environment.

The transflective film 17 at the bottom surface of the color conversion film 12 allows light of a blue wavelength range to be transmitted, while reflecting light of green and red wavelength ranges.

The transflective film 17 may be formed of a dielectric multilayer of a silicon oxide and a titanium oxide.

In this case, a silicon oxide layer can prevent the permeation of moisture and oxygen, as can the barrier film 27.

In general, when the light source emitting blue light is used, white light in which blue, green, and red light are mixed can be produced if the light emitted from the light source passes through the fluorescent sheet 10 including the red and green fluorescent dots 13 and 15 of the color conversion film 12.

Because the red and green light emitted from the fluorescent dots 13 and 15 that are included in the color conversion film 12 are emitted not only toward a front side thereof but toward all sides thereof (front, lateral, and rear sides), an amount of light emitted toward the front side corresponds to about 50% of the actually emitted light.

The transflective film 17 allows the red and green light of the red and green fluorescent dots 13 and 15, which is emitted toward the sides other than the front side, to be reflected such that it is emitted from the front side of the transflective film 17, thereby improving light efficiency.

Simultaneously, because the blue light of the light source that emits the blue light is not reflected by the reflective film 17 but is transmitted through the front side thereof, overall efficiency of the forwardly emitted light from the color conversion film 12 can be improved.

The transflective film 17 may be formed to have a thickness of less than 1.5 μm, preferably 0.1 μm to 1.5 μm.

Though not illustrated in FIG. 2, adhesive layers may be further included between the color conversion film 12 and the barrier film 27 and between the color conversion film 12 and the transflective film 17.

In addition, protective films (not shown) may be further included on an external surface of the fluorescent sheet 10, that is, on respective surfaces of the barrier film 27 and the transflective film 17 that do not contact the color conversion film 12.

The protective film, as a release film, may be formed of a polyester such as polyethylene terephthalate.

A liquid crystal display (LCD) including the fluorescent sheet 10 according to an example embodiment of the present disclosure will now be described with reference to FIG. 3.

Figure 3:
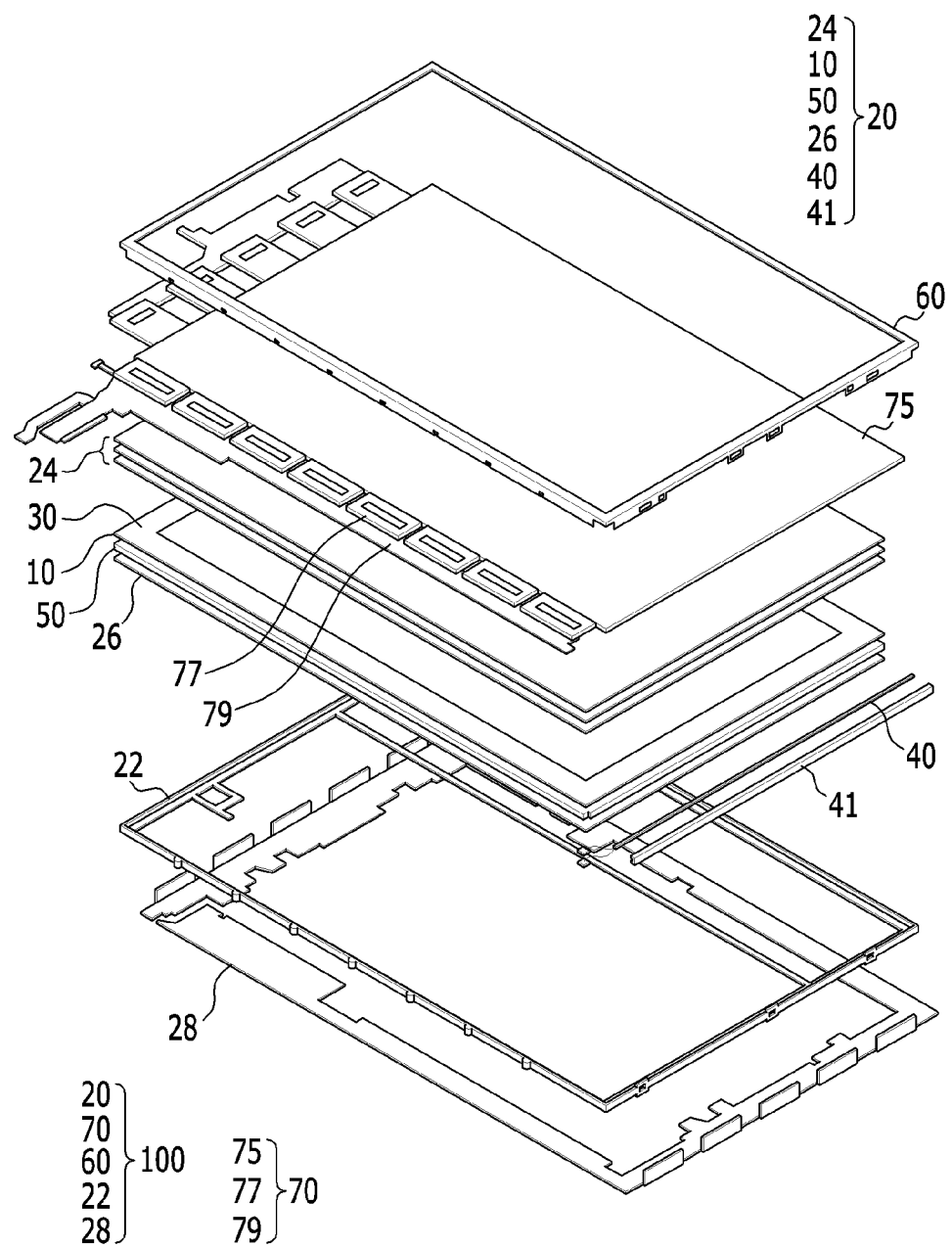
FIG. 3 is an exploded perspective view of a liquid crystal display including the fluorescent film of FIG. 1.

FIG. 3 is an exploded perspective view of a liquid crystal display (LCD) including the fluorescent film of FIG. 1.

As an example of a display device, the LCD 100 is illustrated in FIG. 3.

Generally, the LCD 100 according to an example embodiment of the present disclosure includes a light unit 20 for supplying light, and a liquid crystal panel assembly 70 that is supplied with the light to display an image.

In addition, a top chassis 60, a mold frame 22, and a bottom chassis 28 are provided to fixedly support them.

The light unit 20 supplies the light to the liquid crystal panel assembly 70, and the liquid crystal panel assembly 70 positioned above the light unit 20 controls the light supplied from the light unit 20 to express gray levels, thereby displaying an image.

The liquid crystal panel assembly 70 includes a liquid crystal panel 75, an integrated circuit (IC) chip 77, and a flexible printed circuit (FPC) board 79.

The liquid crystal panel 75 consists of a TFT substrate including a plurality of thin film transistors (TFTs), an upper substrate on the TFT substrate, and a liquid crystal layer injected between these substrates.

The IC chip 77 can be mounted on the TFT substrate to control the liquid crystal panel 75.

The TFT substrate refers to a transparent insulation substrate in which the TFTs are formed in a matrix form, and a source terminal thereof is coupled to a data line and a gate terminal thereof is coupled to a gate line.

In addition, a drain terminal thereof is coupled to a pixel electrode formed of, for example, indium tin oxide (ITO), which is a transparent conductive material.

The data and gate lines of the liquid crystal panel 75 are coupled to the FPC board 79 and, if an electrical signal is received from the FPC board 79, the received electrical signal is transmitted to the source and gate terminals of the TFT, the TFT is turned on or turned off according to a scanning signal applied to the gate terminal among the transmitted signal, and an image signal applied to the source terminal through the data line is transmitted to or blocked by the drain terminal.

The FPC board 79 receives the image signal from the exterior of the liquid crystal panel 75 and then respectively applies a driving signal to the data and gate lines.

The upper substrate is disposed above and faces the TFT substrate.

The upper substrate refers to a substrate in which RGB color filters for displaying predetermined colors are formed by a thin film forming process and a common electrode formed of ITO is deposited on the color filters.

When a power supply is applied to the gate and source terminals of the TFT to turn on the TFT, an electric field is generated between the pixel electrode and the common electrode of the upper substrate.

The generated electric field changes alignment angles of the injected liquid crystals and then light transmittance is changed according to the changed alignment angles, thereby producing the desired image.

Polarizers (not shown) are attached outside of the liquid crystal panel 75.

Each of the polarizers has a transmissive axis.

The FPC board 79 generates driving signals such as image and scanning signals for driving the liquid crystal display 100 and a plurality of timing signals for applying these signals at appropriate timing, and applies the image and scanning signals to the gate and data lines of the liquid crystal panel 75, respectively.

A structure of the liquid crystal panel 75 has been described above.

However, unlike the example embodiment described above, various other example embodiments of the liquid crystal panels 75 can be used.

For example, the common electrode and the color filter that are formed on the upper substrate may be formed on the TFT substrate.

In addition, an additional printed circuit board (PCB) may be included, and the PCB and the TFT substrate may be coupled through the FPC board.

In addition, various other example embodiments of a non-emissive display panel can be used.

The light unit 20 is provided to supply uniform light to the liquid crystal panel 75 under the liquid crystal panel assembly 70 and is disposed on the bottom chassis 28.

The top chassis 60 is provided on the liquid crystal panel assembly 70 to bend the FPC board 79 outside of the mold frame 22 and to prevent the liquid crystal panel assembly 70 from being disengaged from the bottom chassis 28.

The light unit 20 includes one or more light sources 40 that are fixed to the mold frame 22 and supply light to the liquid crystal panel assembly 70, a substrate 41 for supplying power to the light source 40, a light guide panel 50 that guides the light emitted from the light source 40 to supply it to the liquid crystal panel assembly 70, a reflective sheet 26 that is positioned under the light guide panel 50 to cover an entire surface thereof to reflect the light, and an optical sheet 24 and a fluorescent sheet 10 that ensure luminance characteristics of the emitted light from the light source 40 to provide the light to the liquid crystal panel assembly 70.

The optical sheet 24 may include at least one of a prism sheet having a prism structure and a diffuser sheet that uniformly diffuses light.

In addition, the optical sheet 24 may further include a luminance enhancement film such as a dual brightness enhancement film (DBEF) that reflects light of some polarization directions but transmits light of other polarization directions perpendicular thereto.

The fluorescent sheet 10 may be positioned above or below the optical sheet 24, or may be positioned, if a plurality of optical sheets 24 are used, between the optical sheets 24.

The example embodiment of FIG. 3 uses a light emitting diode (LED) as the light source 40.

The LED may be a diode for emitting blue light or ultraviolet rays.

In addition, a diode for emitting light of a specific wavelength can be used.

As described above, when the light source 40 does not emit the white light but the light of the specific wavelength, blue light or ultraviolet rays manufacturing cost of the light source 40 decreases because a phosphor is not additionally formed in an LED package, which is used for the light source 40, to change the light of the specific wavelength into the white light.

As described above, the reason why the light source 40 for emitting the light of the specific wavelength can be used is that the fluorescent sheet 10 can amplify or generate the light of the different wavelength to supply it to the liquid crystal panel 75 above the light unit 20.

That is, while being positioned so as to be spaced apart by a predetermined distance from the LED light source 40, the fluorescent sheet 10 functions as a light converting layer that converts the light emitted from the LED light source 40 into the white light and to emit it toward the liquid crystal panel assembly 70.

When the light emitted from the LED light source 40 passes through the fluorescent sheet 10 including the fluorescent dots, the white light in which blue, green, and red light are mixed can be produced.

In this case, when compositions and sizes of the fluorescent dots forming the fluorescent sheet 10 are varied such that desired ratios of the blue, green, red light can be controlled, the white light exhibiting excellent color reproducibility and purity can be produced.

In this case, the fluorescent dot may be one selected from an organic compound, an inorganic compound, and a semiconductor nanocrystal, or a combination thereof.

Among the organic compounds, a green organic phosphor may include, for example, one or more of coumarin-based, fluorescein-based, cyanine-based, boron dipyrromethene-based, dansyl-based, acridine-based, SYBR green-based, and rhodamine-based compounds, and a red organic phosphor may include one or more of rhodamine-based, dicyanomethane (DCM)-based, benzophenoxazine-based, boron dipyrromethene (BODIPY)-based, perylene-based, Nile red-based compounds, but they are not limited thereto.

Among the inorganic compounds, a green inorganic phosphor may include one or more of oxide-based, sulfide-based, and nitride-based compounds.

An oxide-based green inorganic phosphor may include one of silicate-based compounds such as $(Sr,Ba,Ca,Mg)_2SiO_4:Eu^{2+}$ having a composition of $M_2SiO_4$ and $(Sr,Ba,Ca,Mg)_3SiO_5:Eu^{2+}$ having a composition of $M_3SiO_5$, sulfide-based compounds having a composition of $SrGa_2S_4:Eu$, or nitride-based compounds having a composition of β-SiAlON.

A nitride-based green inorganic phosphor may include a crystal (β-SiAlON:$Eu^{2+}$) of Eu-doped nitrides or oxynitrides among crystals having a crystalline structure of β-type $Si_3N_4$.

An oxynitride-based green inorganic phosphor may include a phosphor such as $(Sr,Ba)Si_2O_2N_2:Eu^{2+}$, $(Ba,Sr,Ca)_2SiO_4:Eu^{2+}$, or $Ba_3Si_6O_{12}N_2:Eu^{2+}$.

A red-based inorganic phosphor may include one or more of nitride-based compounds, and may use one or more selected from $(Sr,Ca)AlSiN_3:Eu^{2+}$ and $(Ba,Sr,Ca)_2Si_5N_8:Eu^{2+}$.

The semiconductor nanocrystal may be selected from group II-VI compounds, group IV-VI compounds, group IV elements, group IV compounds, and a combination thereof.

The group II-VI compound may be selected from a group of: two-element compounds selected from CdSe, CdTe, ZnS, ZnSe, ZnTe, ZnO, HgS, HgSe, HgTe, MgSe, MgS, and a mixture thereof; three-element compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and mixture thereof; and four-element compounds selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

A group III-V compound may be selected from a group of: two-element compounds selected from GaN, GaP, GaAs, GaSb, AlN, AlP, AlAs, AlSb, InN, InP, InAs, InSb, and a mixture thereof; three-element compounds selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and four-element compounds selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The group IV-VI compound may be selected from a group of: two-element compounds selected from SnS, SnSe, SnTe, PbS, PbSe, PbTe, and a mixture thereof; three-element compounds selected from SnSeS, SnSeTe, SnSTe, PbSeS, PbSeTe, PbSTe, SnPbS, SnPbSe, SnPbTe, and a mixture thereof; and four-element compounds selected from SnPbSSe, SnPbSeTe, SnPbSTe, and a mixture thereof.

The group IV element may be selected from a group of Si, Ge, and a mixture thereof.

The group IV compound may be a two-element compound selected from a group of SiC, SiGe, and a mixture thereof.

In the fluorescent sheet 10 according to an example embodiment of the present disclosure, it is preferable that a single organic compound or inorganic compound is exclusively used or a combination of organic compounds or inorganic compounds is used, and a semiconductor nanocrystal may be additionally included.

Because a cost of the semiconductor nanocrystal is high compared with those of the organic and inorganic compounds and cadmium Cd generally used as a forming material for the semiconductor nanocrystal is environmentally harmful because it is a heavy metal, the semiconductor nanocrystal is partially or entirely replaced by the organic or inorganic compound, thereby enhancing cost-effectiveness and environmental friendliness.

In order to obtain light having the desired color, the color conversion film 12 may include 0.4 wt % to 0.8 wt % of the fluorescent dots 13 and 15 based on its total weight, and it may be formed to have a thickness of 20 μm to 150 μm, and the values are preferably 0.5 wt % and 100 μm.

This is because, when too many fluorescent dots 13 and 15 are included, the fluorescent dots 13 and 15 may interact with each other to cause a side effect of extinguishing light, and fluorescence having desired light colors cannot be implemented when the thickness of the color conversion film is too thinly formed.

Alternatively, the fluorescent sheet 10 may consist of a plurality of layers that include a first layer including the red fluorescent dots and a second layer including the green fluorescent dots.

In this case, the plurality of layers may be disposed such that they have light-emitting wavelengths of lower energy when being closer to the LED light source 40.

For example, if the LED light source 40 is a blue LED light source, the fluorescent sheet 10 may consist of a red light conversion layer and a green light conversion layer that are sequentially laminated in a direction away from the LED light source 40.

The fluorescent sheet 10 according to the example embodiment of the present disclosure includes the barrier film 27 provided at the top surface of the color conversion film 12 to protect the color conversion film 12 from the external environment, and the transflective film 17 provided at the bottom surface of the color conversion film 12 to reflect the light emitted from the lateral and rear sides of the color conversion film 12 to the front side thereof.

The transflective film 17 is a dielectric multilayer of a silicon oxide and a titanium oxide, allowing light of the blue wavelength range to be transmitted while allowing light of the green and red wavelength ranges to be reflected.

The transflective film 17 may be formed to have a thickness of less than 1.5 μm, preferably a thickness of 0.1 μm to 1.5 μm.

The transflective film 17 reflects the red and green light of the red and green fluorescent dots 13 and 15, which are emitted from the surfaces other than the front surface, such that they are emitted toward the front surface, thereby improving the light efficiency.

Simultaneously, because the blue light emitted by the light source emitting the blue light is not reflected by the reflective film 17 but is transmitted through the front surface, the overall efficiency of the light emitted toward the front surface from the color conversion film 12 can be improved.

In some example embodiments, a light source 40 emitting ultraviolet rays can be used.

In addition, the light source 40 may be an edge-type light unit 20 at one side of the light guide panel 50, or may have a direct-type structure in which the light source 40 is positioned under the fluorescent sheet 10 in some example embodiments.

The white light emitted from the light unit 20 passes through the polarizers (not shown) and the liquid crystal panel 75 to form the image of predetermined colors.

An experimental example of the fluorescent sheet 10 according to an example embodiment of the present disclosure will now be described with reference to FIGS. 4 and 5.

Figure 4:
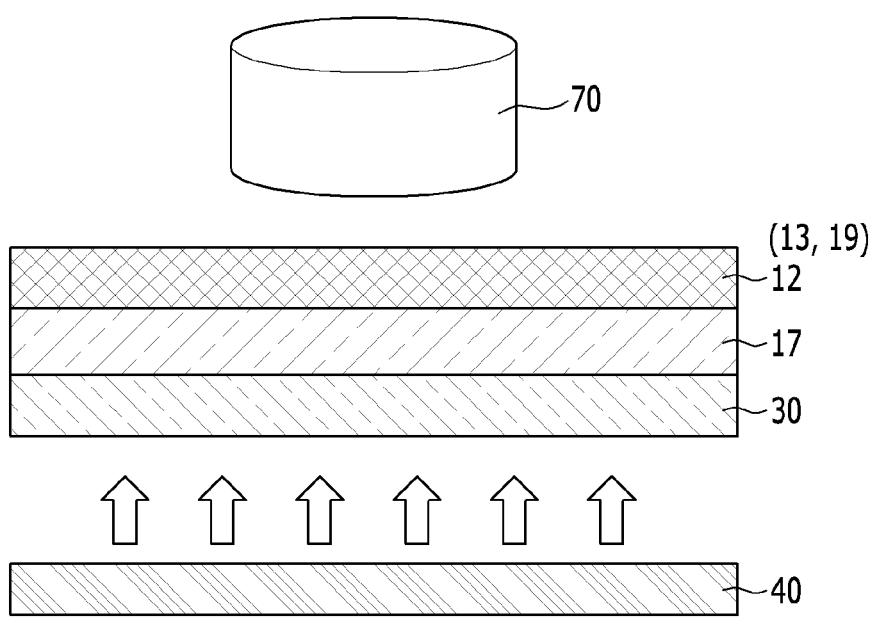
FIG. 4 is a schematic view of an experiment for measuring light efficiency of the fluorescent film according to an example embodiment of the present disclosure.
Figure 5A:
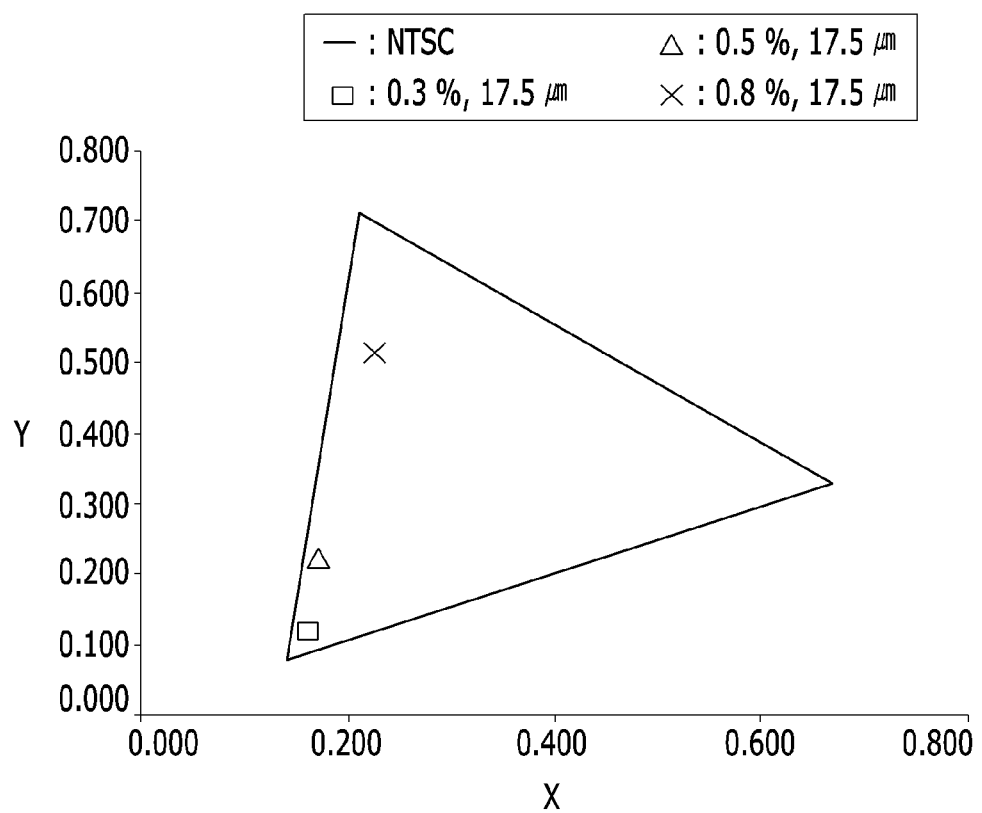
FIGS. 5A and 5B are graphs in which color coordinates are shown according to a result of the experiment of FIG. 4.
Figure 5B:
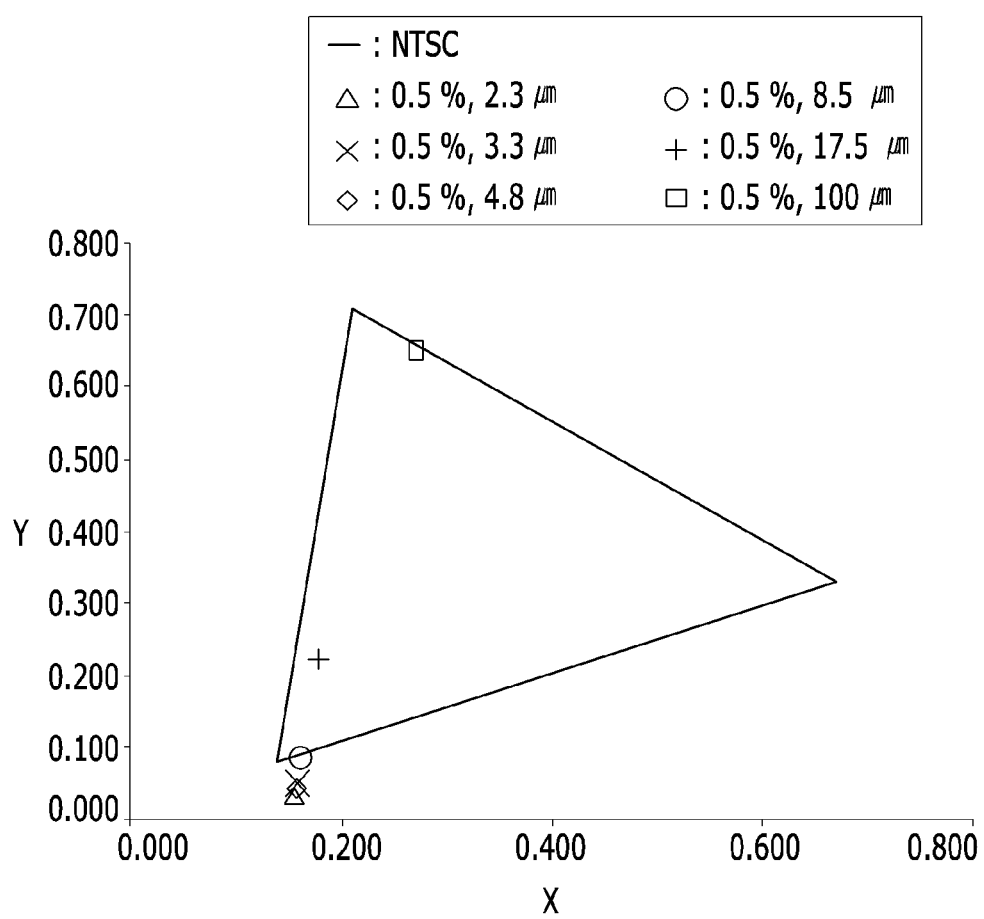

FIG. 4 is a schematic view of an experiment for measuring light efficiency of the fluorescent film according to the example embodiment of the present disclosure, and FIGS. 5A and 5B are graphs in which color coordinates are illustrated according to a result of the experiment of FIG. 4.

Referring to FIG. 4, to measure light efficiency of the fluorescent sheet to which the transflective film and the organic phosphor according to an example embodiment of the present disclosure are applied, a glass substrate 30 is disposed above the blue LED light source 40, and the transflective film 17 and the color conversion film 12 containing 0.5 wt % of the fluorescent dots 13 formed of the green organic phosphor based on the total weight of the color conversion film 12 are disposed on the glass substrate 30.

In addition, a measurement unit 70 is disposed above the color conversion film 12 to measure efficiency of the green light, which is emitted out of the color conversion film 12.

In this case, the light efficiency is measured under a condition where coumarin6 is used as the green inorganic fluorescent dot 13 and a thickness of the color conversion film 12 is varied from 2.3 μm to 100 μm.

A measurement result of the light efficiency is shown in the following Table 1.

TABLE 1

| Fluorescence efficiency (%) | Transflective film | No transflective film | Ratio of transflective film to no transflective film |
|---|---|---|---|
| Green phosphor 0.5 wt %-2.3 μm | 12.6 | 9.2 | 136.9 |
| Green phosphor 0.5 wt %-3.3 μm | 11.3 | 9.2 | 122.5 |
| Green phosphor 0.5 wt %-4.8 μm | 10.8 | 8.9 | 122.4 |
| Green phosphor 0.5 wt %-8.5 μm | 10.3 | 8.8 | 117.3 |
| Green phosphor 0.5 wt %-17.5 μm | 9.9 | 8.6 | 114.8 |

TABLE 1-continued

| Fluorescence efficiency (%) | Transflective film | No transflective film | Ratio of transflective film to no transflective film |
|---|---|---|---|
| Green phosphor 0.5 wt %-100 μm | 9.4 | 8.1 | 115.9 |

As shown in Table 1, it can be seen that the fluorescent sheet to which the green organic phosphor and the transflective film are applied has higher fluorescence efficiency compared with one to which no transflective film is applied.

The reason why the fluorescence efficiency decreases as the thickness of the color conversion film increases is that the amount of the incident light from the blue LED light source increases as the thickness of the color conversion film increases in the ratio of "emitted green light to incident blue light" that represents the fluorescence efficiency.

Next, Referring to FIGS. 5A and 5B, as an example embodiment to measure color coordinates of the light emitted through the color conversion film, the color coordinates of the green light are measured under a condition where a content of the green inorganic fluorescent dots is varied while fixing a thickness of the color conversion film (refer to FIG. 5A), and as another example embodiment, the color coordinates of the green light are measured under a condition where the thickness of the color conversion film is varied while fixing the content of the green inorganic fluorescent dots (refer to FIG. 5B).

Referring to FIGS. 5A and 5B, both a horizontal axis and a vertical axis represent the color coordinate values, and it can be seen that, as the content of the fluorescent dots increases or the thickness of the color conversion film increases, the color coordinates of the green are almost identically implemented.

As described above, according to the present disclosure, instead of a semiconductor nanocrystal, an organic or inorganic phosphor is partially or entirely applied to the fluorescent sheet and the transflective film is applied to the bottom surface of the fluorescent sheet, thereby having an advantage of enhancing the light efficiency without causing harm to the environment as well as reducing manufacturing cost.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

<Description of Symbols>

| | |
|---|---|
| 10: fluorescent sheet | 12: color conversion film |
| 13, 15: fluorescent dot | 19: polymer layer |
| 17: transflective film | 27: barrier film |
| 100: liquid crystal display | 20: light unit |
| 40: light source | 75: liquid crystal panel |
| 50: light guide panel | 70: liquid crystal panel assembly |
| 60: top chassis | 22: mold frame |
| 28: bottom chassis | 77: IC chip |
| 79: flexible printed circuit (FPC) board | 24: optical sheet |
| 26: reflective sheet | |

What is claimed is:

1. A fluorescent sheet comprising:
a color conversion film including a polymer layer and fluorescent dots, the fluorescent dots distributed within the polymer layer;
a barrier film at one surface of the color conversion film; and
a transflective film at another surface of the color conversion film,
wherein the fluorescent dots include an organic compound and an inorganic compound,
the fluorescent sheet does not comprise a semiconductor nanocrystal,
the organic compound and the inorganic compound include one or more of a green phosphor and a red phosphor,
the color conversion film contains 0.4 to 0.8 wt % of the fluorescent dots based on its total weight, and
the color conversion film is formed to have a thickness of 20 μm to 150 μm.

2. The fluorescent sheet of claim 1, wherein
the green organic compound includes one or more of coumarin-based, fluorescein-based, cyanine-based, boron dipyrromethene-based, dansyl-based, acridine-based, SYBR green-based, and rhodamine-based compounds, and
the red organic compound includes one or more of rhodamine-based, DCM dicyanomethane-based, benzophenoxazine-based, boron dipyrromethene-based, perylene-based, and Nile red-based compounds.

3. The fluorescent sheet of claim 1, wherein
the green inorganic compound includes one or more selected from oxide-based, sulfide-based, and nitride-based compounds, wherein
the oxide-based compound is $(Sr,Ba,Ca,Mg)_2SiO_4:Eu^{2+}$ or $(Sr,Ba,Ca,Mg)_3SiO_5:Eu^{2+}$,
the sulfide-based compound is $SrGa_2S_4:Eu$,
the nitride-based compound is $(\beta\text{-SiAlON}:Eu^{2+})$, $(Sr,Ba)Si_2O_2N_2:Eu^{2+}$, $(Ba,Sr,Ca)_2SiO_4:Eu^{2+}$, or $Ba_3Si_6O_{12}N_2:Eu^{2+}$, and
the red inorganic compound includes a nitride-based compound and one or more selected from $(Sr,Ca)AlSiN_3:Eu^2$ and $(Ba,Sr,Ca)_2Si_5N_8:Eu^{2+}$.

4. The fluorescent sheet of claim 1, wherein
the barrier film includes one or more selected from a polyethylene terephthalate (PET) film, polycarbonate (PC), and co-polyethylene terephthalate (CoPET).

5. The fluorescent sheet of claim 4, wherein
the color conversion film and the barrier film further include an inorganic oxide, and
the inorganic oxide includes one or more selected from silica, alumina, titania, and zirconia.

6. The fluorescent sheet of claim 1, wherein
the transflective film transmits blue light but reflects green and red light.

7. The fluorescent sheet of claim 6, wherein
the transflective film includes a dielectric multilayer of a silicon oxide and a titanium oxide.

8. The fluorescent sheet of claim 6, wherein
the transflective film is formed to have a thickness of 0.1 μm to 1.5 μm.

9. A light unit comprising:
a light source;
a fluorescent sheet installed to be spaced apart from the light source and converting incident light from the light source into white light to emit it toward a liquid crystal panel; and
a light guide panel positioned between the light source and the fluorescent sheet, wherein the fluorescent sheet includes:
a color conversion film including fluorescent dots and a polymer layer where the fluorescent dots are distributed;
a barrier film positioned at one surface of the color conversion film; and
a transflective film positioned at another surface of the color conversion film,
wherein the fluorescent dots include an organic compound and an inorganic compound, the fluorescent sheet does not comprise a semiconductor nanocrystal,
the organic compound and the inorganic compound include one or more of a green phosphor and a red phosphor,
the color conversion film contains 0.4 to 0.8 wt % of the fluorescent dots based on its total weight, and
the color conversion film is formed to have a thickness of 20 μm to 150 μm.

10. The light unit of claim 9, wherein
the transflective film transmits blue light but reflects green and red light.

11. The light unit of claim 10, wherein
the transflective film includes a dielectric multilayer of a silicon oxide and a titanium oxide, and is formed to have a thickness of 0.1 μm to 1.5 μm.

12. A liquid crystal display comprising:
a liquid crystal panel; and
a light unit positioned under the liquid crystal panel, wherein the light unit includes:
a light source;
a fluorescent sheet installed to be spaced apart from the light source and converting incident light from the light source into white light to emit it toward the liquid crystal panel; and
a light guide panel positioned between the light source and the fluorescent sheet, wherein the fluorescent sheet includes:
fluorescent dots and a polymer layer where the fluorescent dots are distributed;
a barrier film positioned at one surface of the color conversion film; and
a transflective film positioned at another surface of the color conversion film,
wherein the fluorescent dots include an organic compound and an inorganic compound, the fluorescent sheet does not comprise a semiconductor nanocrystal,
the organic compound and the inorganic compound include one or more of a green phosphor and a red phosphor,
the color conversion film contains 0.4 to 0.8 wt % of the fluorescent dots based on its total weight, and
the color conversion film is formed to have a thickness of 20 μm to 150 μm.

13. The liquid crystal display of claim 12, wherein
the transflective film transmits blue light but reflects green and red light and includes a dielectric multilayer of a silicon oxide and a titanium oxide, and is formed to have a thickness of 0.1 μm to 1.5 μm.

* * * * *